United States Patent Office 3,042,529
Patented July 3, 1962

---

3,042,529
COMPOSITIONS AND METHODS FOR IMPROVING MEAT
Simone Marie-Antoinette Radouco-Thomas, 44 Route des Acacias, Geneva, Switzerland
No Drawing. Filed Dec. 9, 1959, Ser. No. 858,327
Claims priority, application Great Britain Dec. 17, 1958
11 Claims. (Cl. 99—107)

This invention is concerned with compositions for the production of meat of improved quality, particularly pork meat.

As is known, carcasses may be defective in a number of ways which lower their saleability. Thus, in the case of pig carcasses particular reference can be made to a particular condition which lowers very considerably the saleability of the meat. In the case of pigs, from 10 to as much as 80% of a batch of animals may suffer from this condition which is characterised by muscular depigmentation, and by the fact that the muscles become flaccid and have an acid reaction, and that the volume of liquid which exudes spontaneously is much greater than that of unaffected animals; the exudate also contains a high proportion of potassium ions. Carcasses showing this condition are known as exudative carcasses and are of considerably lower quality and therefore less saleable than other carcasses. Although the incidence of this condition is in general the greatest in the pig it nevertheless occurs in other animals.

The pathology of muscle fibres exhibiting the characteristics mentioned above, which is referred to as "myopathic depigmentation and exudation" or as "maladie d'Enter," has not yet been elucidated and measures for its prevention have been limited to improving the food and living conditions of the animals liable to the conditions. It should be noted that it is not generally possible to determine prior to slaughter which animals will give carcasses exhibiting the condition described above and therefore it is not generally possible to effect a separation between affected and unaffected animals.

I have found that the occurrence of this condition is associated with a depletion in the quantity of adrenergic amines in the animal body either ante- or post-mortem, and that the incidence of the condition can be reduced by administration to the animal, either ante- or post-mortem of ascorbic acid and adrenergic amines, salts thereof or compounds which cause formation of such adrenergic amines or their salts.

According to the present invention I provide compositions for the improvement of meat comprising ascorbic acid together with an adrenergic amine or a salt thereof or a compound which causes formation of an adrenergic amine in a living animal. In particular, I prefer to use adrenergic amines of the general formula

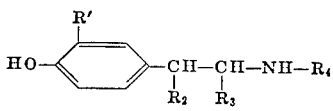

(in which $R^1$ represents a hydroxyl group or a hydrogen atom, $R_2$ represents a hydroxyl group or a hydrogen atom, $R_3$ represents a carboxyl group or a hydrogen atom and $R_4$ represents a methyl group or a hydrogen atom), a salt thereof or a compound which causes formation of said adrenergic amine or a salt thereof in a living animal.

Examples of specific adrenergic amines which may be used in the present compositions include tyrosine, dopa, dopamine and noradrenaline. The preferred amine is, however, adrenaline. Examples of compounds which cause accumulation of biogenic amines as herein defined include adrenochrome and adrenolutine and in particular serotonine, 5-hydroxy-tryptophane and tryptophane.

The ratio of adrenaline to ascorbic acid present in the compositions of the invention is preferably between 1:500 and 1:10, advantageously between 1:100 and 1:20, by weight. Where the compositions comprise serotonine, the ratio of this substance to ascorbic acid may also be between 1:500 and 1:10, advantageously between 1:100 and 1:20 by weight.

As stated above, the compositions of my invention may be administered to marketable animals, particularly pigs, either before or after slaughter to reduce the incidence of myopathic depigmentation and exudation. The presence of ascorbic acid in the compositions appears to reduce or eliminate the tendency to strong sweating produced in an animal injected with adrenaline alone, for example at 40γ/kg. In addition, administration of the compositions of the invention leads to meat which "ages" to a saleable degree of tenderness within a shorter time than the 8 to 21 days which are normally required, often in as little as 24 hours. Further, I have found that if an adrenergic amine such an adrenaline is administered alone to cattle the resulting beef is often unattractively dark whereas when compositions of the invention are administered the beef is the normal red colour. Further, the ascorbic acid appears to enhance and prolong the action of the adrenergic amine. The ascorbic acid appears to be present in appreciable quantities in the meat after slaughter and so adds to the nutritive value of the meat.

In one method of utilising the invention, the compositions of the invention may be administered to the animal orally before slaughter. For convenience in such administration the compositions preferably comprise an orally ingestible diluent and thus, it may be found to be convenient to incorporate the compositions in an animal foodstuff in an amount sufficient to ensure ingestion by the animal of an effective level of the active components.

Suitable orally ingestible diluents include as stated above any convenient animal foodstuff such as cattle food and pig food, and may include diluents which whilst not being nutritious are orally ingestible and serve evenly to disperse the biogenic amines. The diluent may also be water, the solution or suspension being placed before the animal for consumption ad libitum.

It is also possible to administer the compositions orally in the form of dosage units, for example in the form of tablets, ampoules or like unitary preparations. Such a dosage unit conveniently comprises between 250 mg. and 1 gm. of ascorbic acid, the ratio of adrenergic amine to ascorbic acid being substantially as defined above. In such a case the compositions will comprise a suitable solid non-toxic pharmaceutical diluent, such as a tableting base, e.g. lactose.

The compositions may also be administered parenterally. For such parenteral administration they will preferably be formulated in a parenterally-acceptable non-toxic pharmaceutical diluent, in particular a physiological solution, which diluent may contain suitable adjuvants such as suspending and dispersing agents. In compositions of the invention comprising both liquid and solid pharmaceutical diluents, the ratio of diluent to ascorbic acid is preferably between 5:1 and 15:1 by weight, preferably about 10:1.

The ante-mortem administration of the compositions of the invention preferably takes place in the 24 hours preceding slaughter, the quantity of active substances being administered preferably being such that a level of biogenic amines similar to or greater than that in a normal animal is ensured. In the case of parenteral administration the compositions are preferably injected from 1–5 hours before slaughter, for intravenous injection a time of 1 hour before slaughter being suitable and for subcutaneous injection a time of 4 hours before slaughter being suitable.

According to a further feature of the invention therefore, there is provided a method of improving meat in which, after slaughter, the meat is treated with ascorbic acid and an adrenergic amine, or a salt thereof. Preferably the compositions are administered in such an amount as at least to normalize the concentration of biogenic amines present in the animals before slaughter.

It is also possible to administer the compositions of the invention after slaughter, i.e. to the carcasses of the marketable animals, and according to a yet further feature of the invention there is provided a method of improving the meat of marketable animals which comprises treating the carcasses of marketable animals with a composition according to the invention comprising ascorbic acid and an adrenergic amine as herein defined or a salt thereof.

The post-mortem treatment can preferably be effected by injection of the compositions as soon after the death of the animal as possible and before myopathic depigmentation and exudation would normally become manifest in the affected carcasses. Thus, one will in general treat all carcasses and as soon as possible after slaughter because the beneficial effect of the adrenergic amines is reduced if sufficient time elapses for the characteristics mentioned above to become manifest.

It is also possible to treat the carcasses by immersion in an aqueous composition according to the invention, or to dust the surface of the carcasses with one of the solid compositions of the invention.

The administration of the compositions according to the invention may be combined with other steps directed to improving the meat, rather than reducing the incidence of carcasses affected in the manner described above, and according to a further feature of the invention the administration thereto of the compositions of the invention described above is combined with other treatments, such as are described below, in particular treatments for preserving meat.

Thus, to delay deterioration due to endogenic bacteria the compositions of the invention can conveniently also contain a number of substances such as antibiotics in particular of the tetracycline group, for example, aureomycin and terramycin, as well as chelating agents and substances which augment the resistance of the animal.

I have found that where aureomycin is used as antibiotic, this compound tends to counteract the antiautolytic effect of the adrenaline. I have found that an enhanced antiautolytic effect is produced in compositions comprising ascorbic acid, adrenaline and aureomycin if serotonine is also included in the composition. Other antiautolytic compounds which may be added are insulin, glucogen or p-amino benzoic acid.

In addition to the above treatments, a treatment may be carried out post-mortem to reduce degradation by contamination with exogenic bacteria. This treatment may include treatment by radiation, or by various thermal processes, or by smoking, or by treatment with antibiotics, either pure or in crude form, or by other suitable treatments. When using antibiotics it is convenient to use a mixture of antibiotics as the bacterial spectrum of each antibiotic differs from that of another. The antibiotics can be applied in powder form or as a spray.

Conveniently, the antibiotic may be sprayed on the carcass and drying may take place in the presence of ultra-violet light.

Finally, a post-mortem treatment against contamination with exogenic bacteria may be carried out by packing the meat in containers which are impermeable to air and water, after the meat has been subjected to a sterilising treatment.

The following details of a representative treatment according to the invention to which meat may be subjected is given below, by way of example only.

In the first place, adrenaline, ascorbic acid and terramycin are administered to the animal in the slaughter house. These compounds may be administered either simultaneously in the form of a solution containing vitamin C, adrenalin and terramycin, which is injected parenterally, preferably subcutaneously, one to eight hours before killing preferably three to five hours before killing. The adrenalin-vitamin C solution is introduced, immediately before injection, into a phial containing the antibiotic in the form of a powder. The mixed solutions of adrenalin and vitamin C may be packed in phials in quantities sufficient for administration to different animals. Thus, for injection into an animal of from 250–350 kg. one may prepare a phial containing 75 milligrams of adrenalin which can be added to a phial containing 1–5 grams of terramycin immediately prior to injection.

The compounds above may also be administered successively by different or similar routes. Also the antibiotic may be administered by the oral route some 24 hours or less before slaughter while the adrenalin may be administered subcutaneously some 4 hours before slaughter.

The post-mortem treatment can consist, for example, of washing the carcass and spraying it with a dilute solution of antibiotic, preferably terramycin or patulin. The carcass can then be dried in a current of air in the presence of ultra-violet light and after drying, the carcass may be immediately packed in a protective coating which is preferably sterile. It will be understood that the above treatment can also be carried out on parts of a carcass as well as the whole carcass itself.

I claim:

1. Compositions for the improvement of meat comprising ascorbic acid and a substance selected from the group consisting of an adrenergic amine, a salt thereof, serotonine, 5-hydroxy-tryptophane and tryptophane, the ratio of said substance to said ascorbic acid being between 1:500 and 1:10 by weight.

2. Compositions as claimed in claim 1 in which said substance is selected from the group consisting of adrenalin, tyrosine, dopa, dopamine, noradrenaline, serotonine, 5-hydroxy-tryptophane, tryptophane, adrenochrome and adrenolutine.

3. Compositions as claimed in claim 1 in which the substance is adrenaline.

4. Compositions as claimed in claim 1 in which said substance is serotonine.

5. Compositions as claimed in claim 1 in which said substance is a mixture of adrenaline and serotonine, said mixture having a ratio to ascorbic acid between 1:500 and 1:10 by weight, said composition also including an effective amount of aureomycin.

6. Compositions as claimed in claim 1 in dosage form containing from 250 mg. to 1 gm. ascorbic acid.

7. Compositions for the improvement of meat comprising ascorbic acid and a substance selected from the group consisting of an adrenergic amine of the general formula

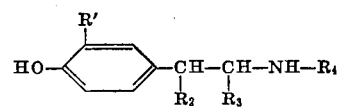

in which R′ is selected from the group consisting of a hydroxyl group and a hydrogen atom, $R_2$ is selected from the group consisting of a hydroxyl group and a hydrogen atom, $R_3$ is selected from the group consisting of a carboxyl group and a hydrogen atom, and $R_4$ is selected from the group consisting of a methyl group and a hydrogen atom; a salt thereof; serotonine; 5-hydroxy-tryptophane and tryptophane, the ratio of said substance to said ascorbic acid being between 1:500 and 1:10 by weight.

8. A method of improving meat in which, after slaughter but before myopathic depigmentation and exudation is manifest in the carcass, the meat is treated with ascorbic acid and a substance selected from the group consisting of an adrenergic amine and a salt thereof, the ratio of said substance to said ascorbic acid between 1:500 and 1:10 by weight, said ascorbic acid and said substance being administered in amounts sufficient to substantially inhibit myopathic depigmentation and exudation of the meat.

9. A method for the improvement of meat in which within 24 hours prior to slaughter there is administered to an animal ascorbic acid and a substance selected from the group consisting of an adrenergic amine, a salt thereof, serotonine, 5-hydroxy-tryptophane and tryptophane, the ratio of said substance to said ascorbic acid being between 1:500 and 1:10 by weight, said substance and said ascorbic acid being administered in amounts sufficient to substantially inhibit myopathic depigmentation and exudation of the meat.

10. A method as claimed in claim 9 in which the dose of said substance administered is such that the concentration of adrenergic amine in the animal to slaughter is at least that normally present in the healthy animal.

11. A method as claimed in claim 10 in which the dose of ascorbic acid administered is between 250 mg. and 1 gm.

References Cited in the file of this patent

UNITED STATES PATENTS

| | | |
|---|---|---|
| 2,351,614 | Hills et al. | June 20, 1944 |
| 2,541,572 | Coleman et al. | Feb. 13, 1951 |
| 2,930,702 | Winterbottom et al. | Mar. 29, 1960 |
| 2,942,982 | Wrenshall et al. | June 28, 1960 |